June 25, 1935.  E. P. BURRELL  2,005,822
HYDRAULIC MACHINE TOOL
Filed Aug. 14, 1931   8 Sheets-Sheet 1
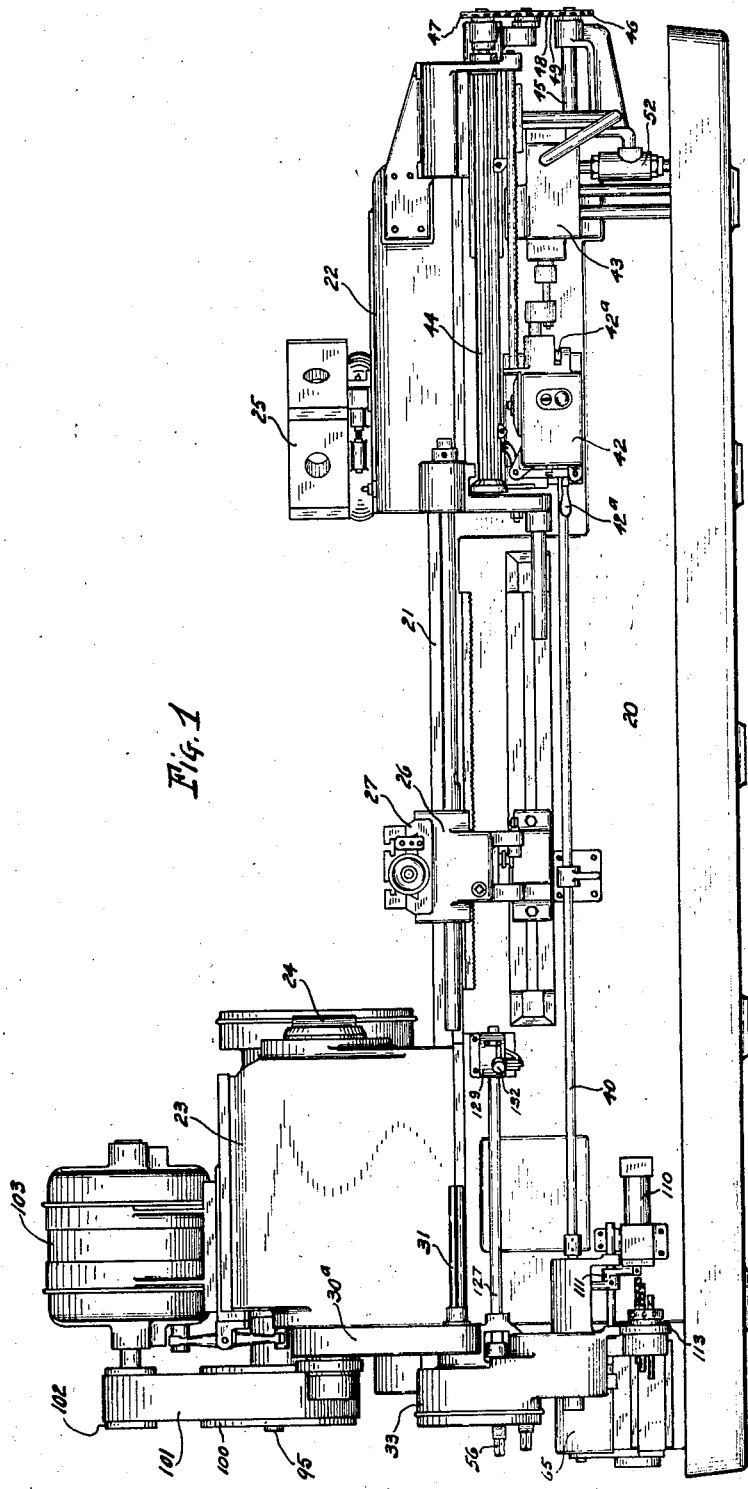
INVENTOR:
EDWARD P. BURRELL
ATTORNEYS June 25, 1935.　　　E. P. BURRELL　　　2,005,822
HYDRAULIC MACHINE TOOL
Filed Aug. 14, 1931　　　8 Sheets-Sheet 2
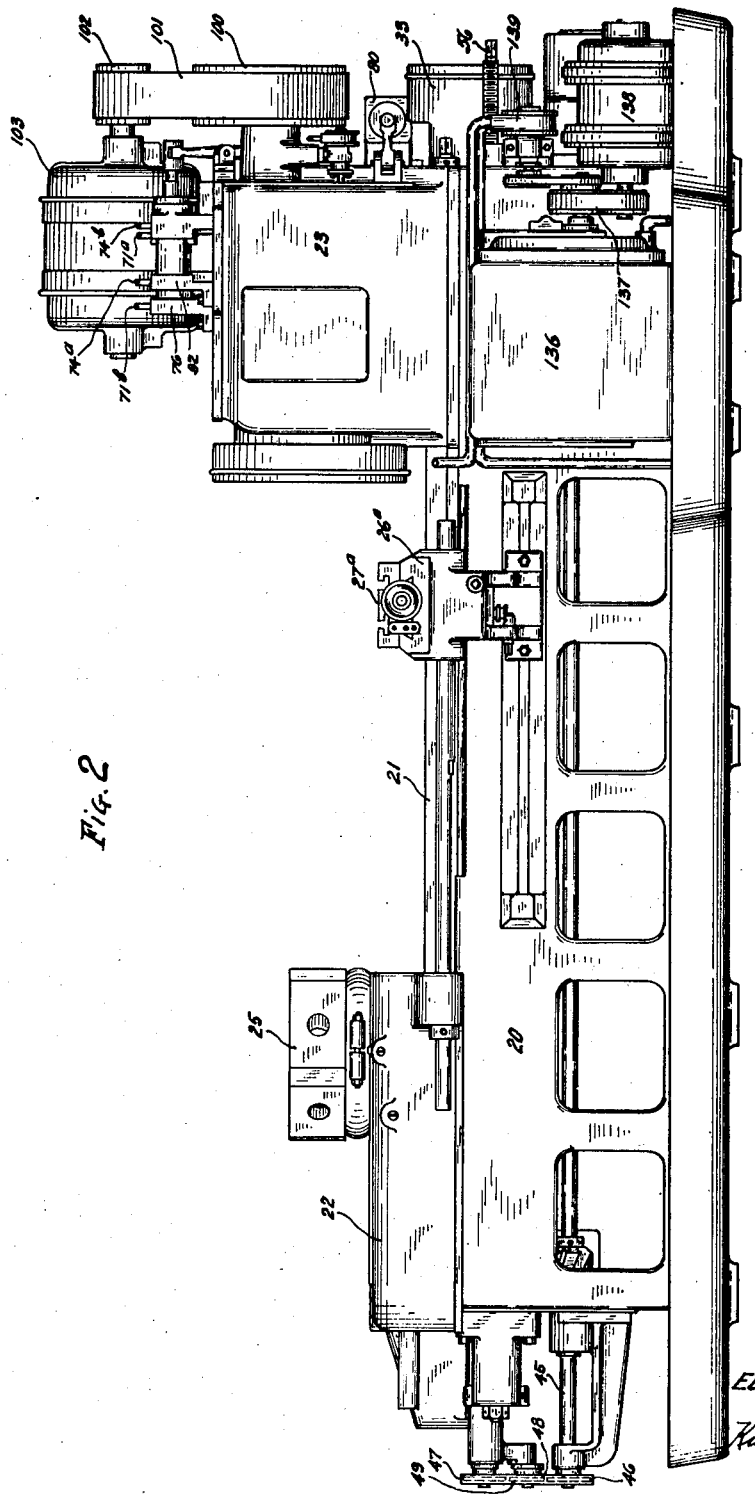
INVENTOR:
EDWARD P. BURRELL
ATTORNEYS

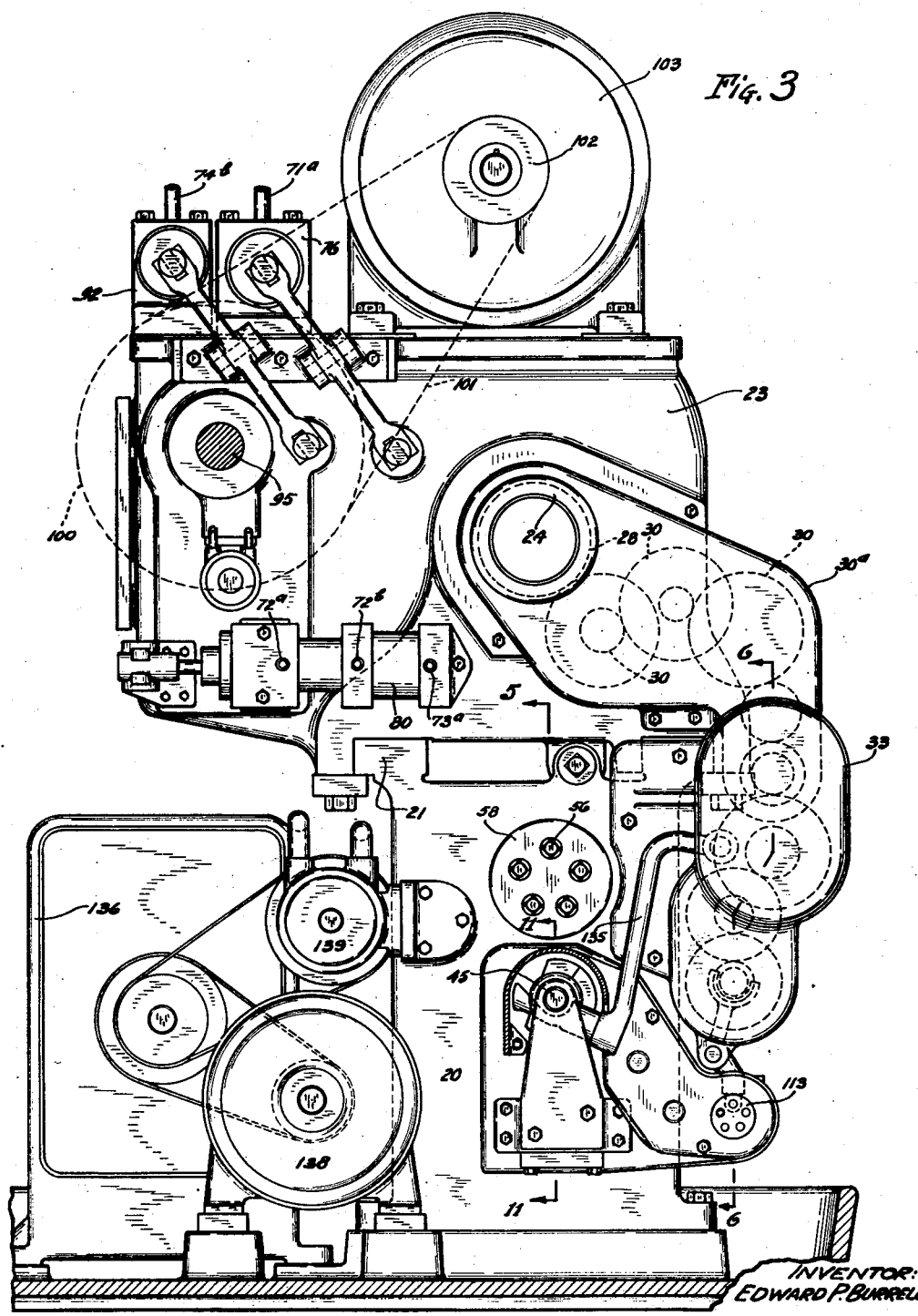

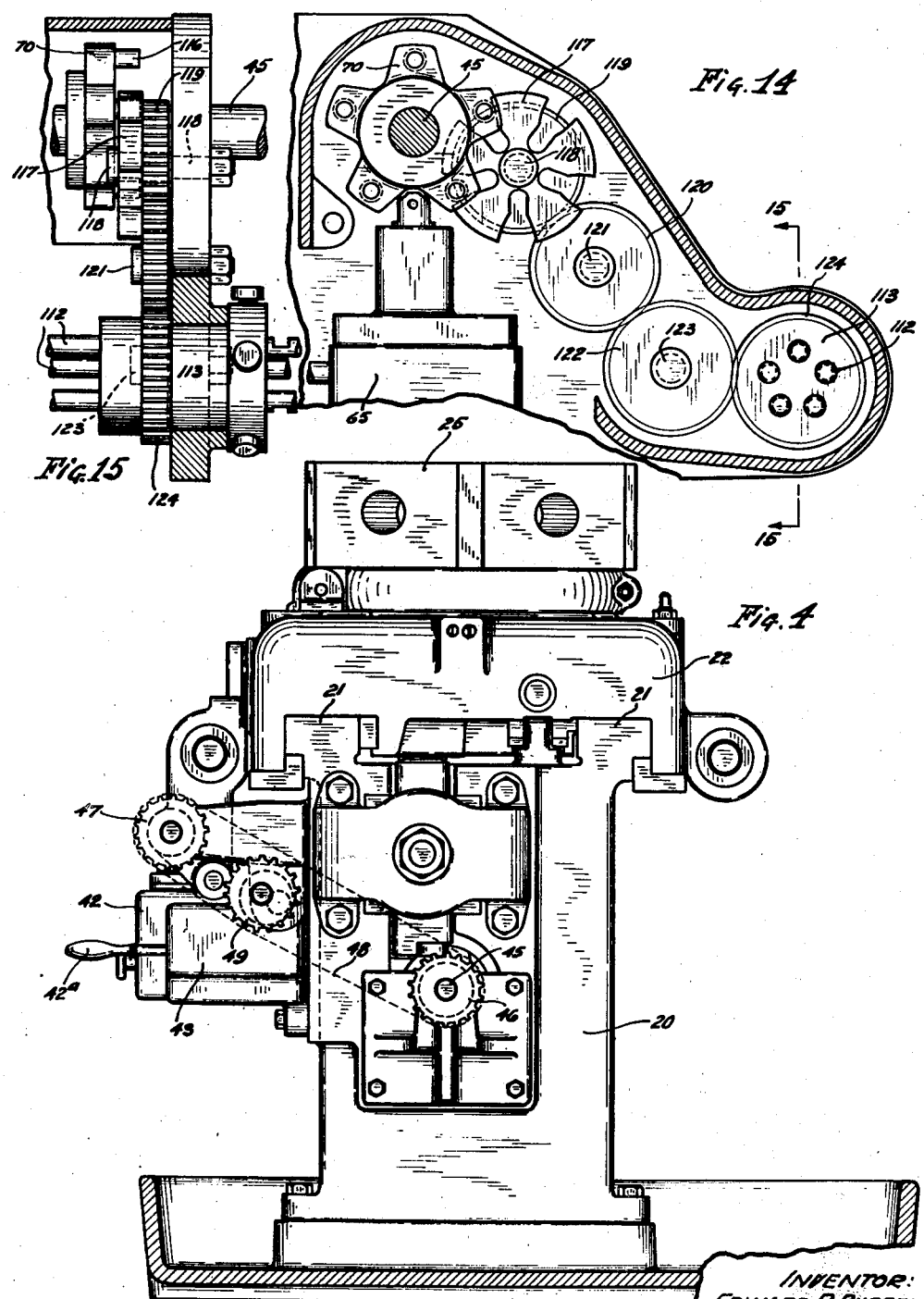

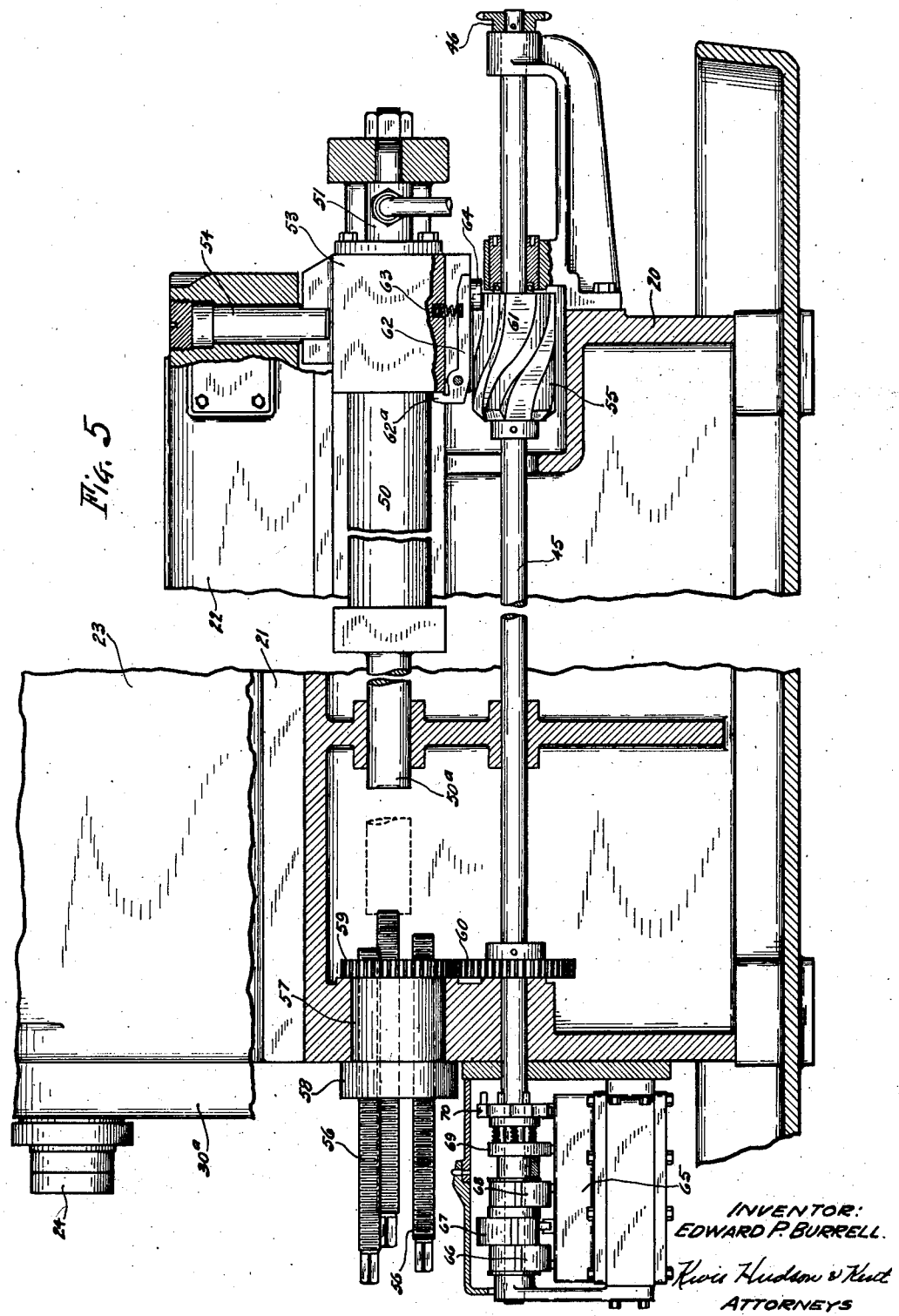

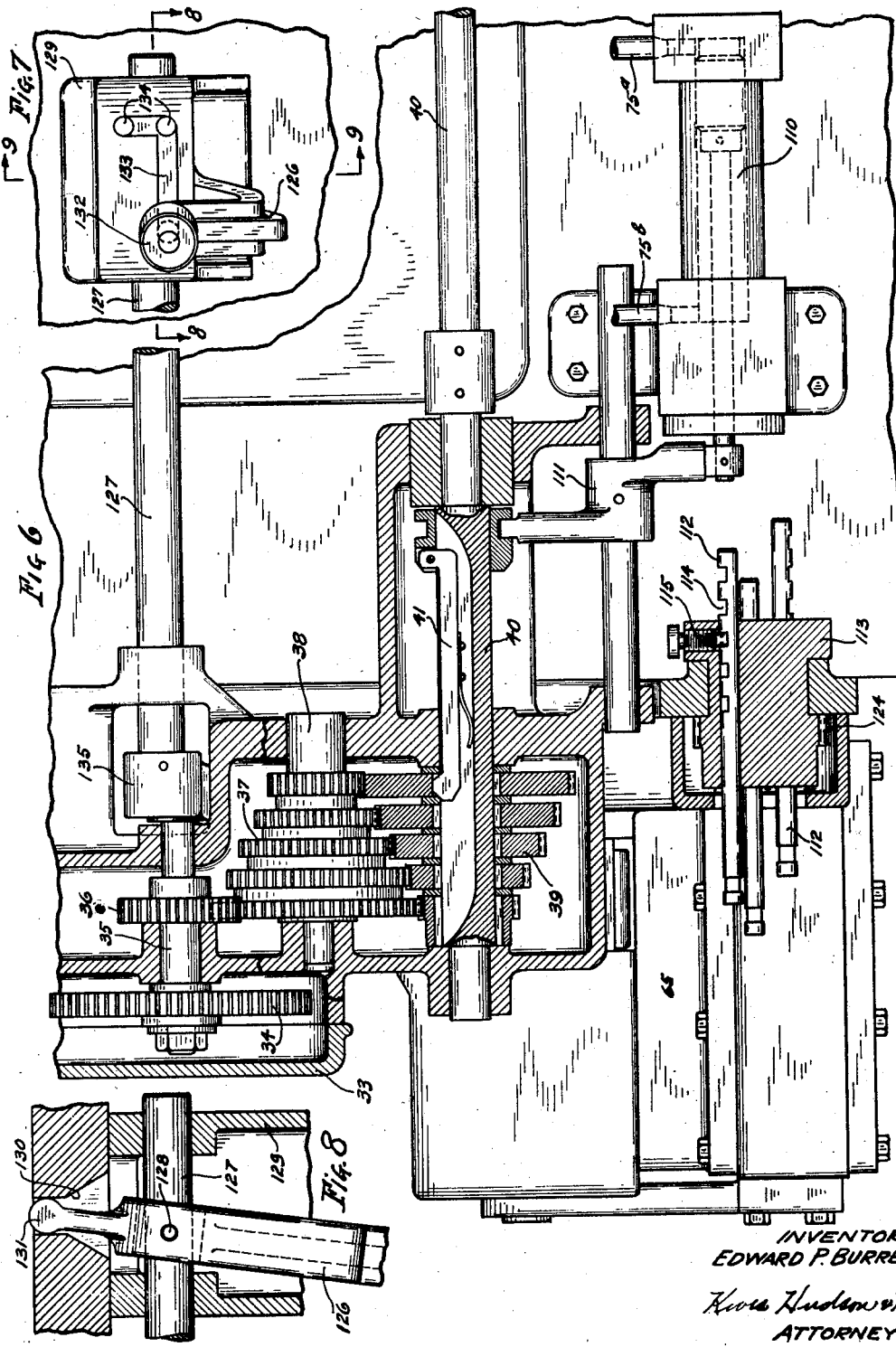

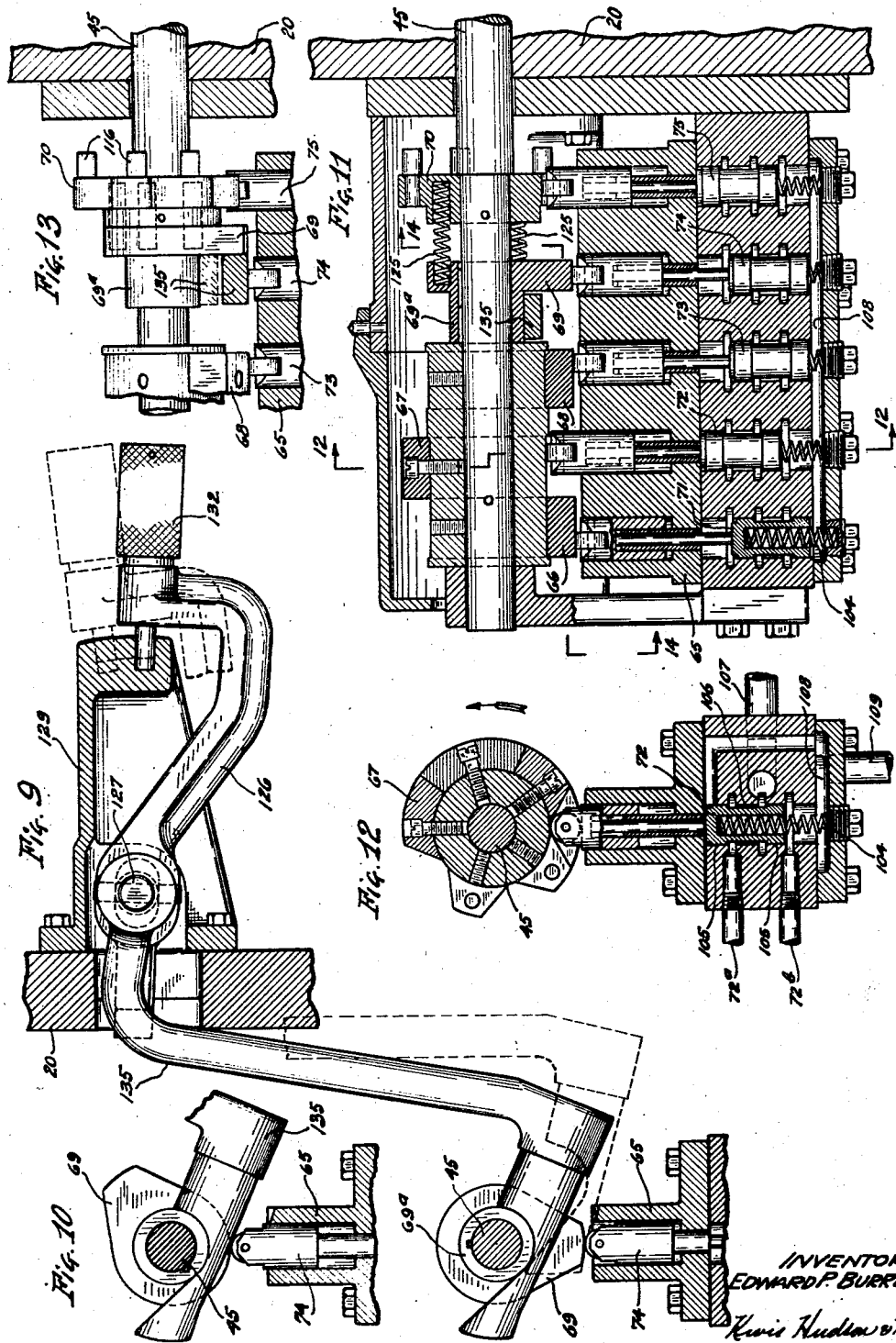

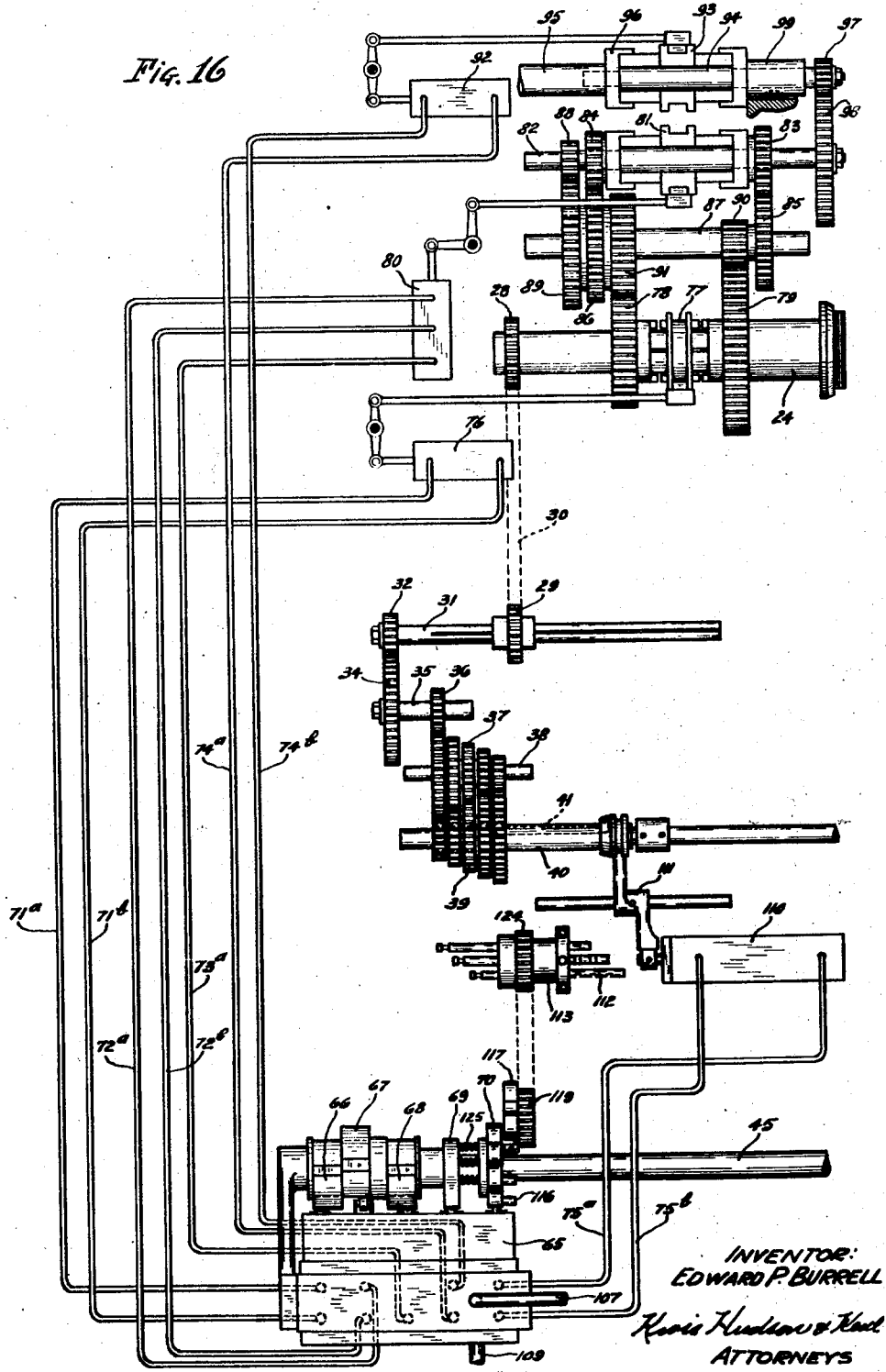

Patented June 25, 1935

2,005,822

UNITED STATES PATENT OFFICE 2,005,822

HYDRAULIC MACHINE TOOL

Edward P. Burrell, Shaker Heights, Ohio, assignor to The Warner & Swasey Company, Cleveland, Ohio, a corporation of Ohio Application August 14, 1931, Serial No. 557,109

49 Claims. (Cl. 29—42)

This invention relates to a machine tool and particularly to the control mechanism for a hydraulically operated machine tool of the type having a work or tool supporting spindle in the head of the machine tool and a tool or work supporting member movable relative to said spindle.

While the invention may be used on various types of hydraulically operated machine tools it has special utility in connection with a hydraulically operated lathe, such as a turret lathe or the like, and for that reason the invention has been illustrated and described herein as applied to a turret lathe.

An object of the invention is to provide in a hydraulically operated machine tool, such as a turret lathe or the like, means operated by a movable member of the machine for actuating in proper sequence a series of valves controlling the hydraulic operating mechanism thereof.

A more specific object is to provide in a hydraulically operated machine tool, such as a turret lathe or the like, a shaft that is actuated by the movement of a slide, such as the turret slide, and which shaft actuates in the proper sequence a series of valves controlling the hydraulic operating mechanism of the machine.

A still further object of the invention is to provide in a hydraulically operated machine tool, such as a turret lathe or the like, a centrally arranged control shaft having an operative connection with the slide of the machine and with the mechanism for indexing an indexible member thereof whereby the indexing of said member is controlled by the movement of said slide.

Another object of the invention is to provide in a hydraulically operated machine tool, such as a turret lathe or the like, a control means located at the head end of the machine and operable for shifting the valves controlling the different operating speeds of the spindle in the head.

Another and more specific object is to provide in a hydraulically operated machine tool, such as a turret lathe or the like, a control cam arranged at the head end of the tool and operable to shift the valves controlling the different operating speeds of the spindle in the head.

Another object is to provide in a hydraulically operated machine tool, such as a turret lathe or the like, a valve and a stop roll controlling a plurality of feeding speeds for the movable member.

A further object is to provide in a hydraulically operated machine tool, such as a turret lathe or the like, a stop roll for the slide that is arranged at the head end of the bed and is operated by a central control shaft carried by the bed and in turn having an operable connection with the slide so as to be controlled by the movements of the slide and an operative connection with the indexing mechanism so that the latter is operated in timed relationship with the stop roll.

Another object is to provide in a hydraulically operated machine tool, such as a turret lathe or the like, means for operating the slide, the stop roll for limiting the movements of the slide, and the indexing mechanism for the turret in timed relation one with the other.

Another object is to provide in a hydraulically operated machine tool, such as a turret lathe or the like, manually operated means connected with a stop and start valve located at the head end of the machine and controlling the stopping and starting of the spindles whereby manual as well as automatic control is provided.

Still further and additional objects will become apparent during the detailed description of an embodiment of the invention that is to follow and which is illustrated in the accompanying drawings wherein Figure 1 is a front elevational view of a hydraulically operated turret lathe embodying the invention.

Fig. 2 is a rear elevational view of the turret lathe shown in Fig. 1.

Fig. 3 is an end elevation of the turret lathe looking from the left hand end of Fig. 1, certain portions being shown in section.

Fig. 4 is an end elevation of the turret lathe looking from the right hand end of Fig. 1.

Fig. 5 is a view of the turret lathe partly in side elevation and partly in section, the section being taken on line 5—5 of Fig. 3 looking in the direction of the arrows.

Fig. 6 is a view partly in side elevation and partly in section, the section being taken substantially on line 6—6 of Fig. 3 looking in the direction of the arrows.

Fig. 7 is a fragmentary side elevational view of the manually operated lever controlling the stop and start valve for the spindle in the head.

Fig. 8 is a detail sectional view taken substantially on line 8—8 of Fig. 7 looking in the direction of the arrows.

Fig. 9 is a sectional view taken substantially on line 9—9 of Fig. 7 looking in the direction of the arrows, the manually operated control lever being shown in full lines in an inoperative position, that is substantially near the right hand end of the slow shown in Fig. 7, and in dotted lines, in an operative position after the lever has been swung upwardly from the full line position.

Fig. 10 is a fragmentary detail view similar to a portion of Fig. 9, except that the valve and cam are shown in a different operative relationship.

Fig. 11 is a sectional view taken substantially on line 11—11 of Fig. 3 looking in the direction of the arrows.

Fig. 12 is a sectional view taken substantially on line 12—12 of Fig. 11 looking in the direction of the arrows.

Fig. 13 is a fragmentary sectional view similar to the upper right hand portion of Fig. 11, but showing a portion of the manually operated lever in a different position with respect to the cam and the cam and valve in a different position with respect to each other.

Fig. 14 is a sectional view taken substantially on line 14—14 of Fig. 11 looking in the direction of the arrows.

Fig. 15 is a sectional view taken substantially on line 15—15 of Fig. 14 looking in the direction of the arrows with a portion of the guard removed, and Fig. 16 is a diagrammatic view showing the relationship between the valves, the valve controlled motors, the gearing for the spindle and the mechanism for clutching said gearing, the valve, motor, the gearing for the movable member, and the mechanism for controlling the varying gear ratios of said gearing for effecting the different rates of feeding movement for said member.

Referring now to the drawings and for the present particularly to Figs. 1, 2, 3 and 4 thereof, the machine tool or turret lathe herein illustrated is provided with a bed 20 having ways 21 on which the hydraulically actuated sliding member, in this instance a tool supporting turret slide 22 is mounted; this slide being movable toward and from the head 23, which head may be adjusted on the ways 21 and clamped thereto and in which the work or tool spindle 24 is rotatably mounted. In some cases the work piece may be supported by the slide member and the tool or tools supported in the head or in other instances the work and tools may be reversely arranged.

In a machine of the type herein illustrated and having a turret slide 22 provided with a turret 25, the tools are adapted to be mounted on the several faces of the turret, which as herein illustrated are five in number. The tool or tools on each face of the turret are caused to successively operate on the work and each cycle of movement of the turret slide includes a rapid forward movement to bring the tool adjacent to the work, a relatively slow feeding movement for the cutting operation, then the stopping of the slide, followed by a predetermined dwell of the tool at the completion of the cut, and then a relatively rapid return movement back to the point where the cycle is to be repeated. Near the end of the return movement the turret is indexed, each indexing movement in this instance rotating the turret one-fifth of a revolution so as to properly position the tool or tools which are supported on the next or adjacent face of the turret and which operate during the next cycle of operation.

A pair of cross slide carriages 26 and 26a are movably mounted on the ways 21 intermediate the head and the slide 22 for adjustment thereon, ried by the bed, such construction however, not being shown in detail herein since it embraces no part of the present invention. Cross slides 27 and 27a are slidably mounted on the carriages 26 and 26a and have an operative connection with the turret slide, whereby the movement of the turret slide longitudinally of the bed effects and controls the movements of the cross slides transversely of the bed during certain of the operative cycles. The operative connection between the turret slide and the cross slides is brought about by the abutment of a tool holder on one of the faces of the turret with a latch mechanism for connecting the slide to an actuating bar, as is well known in the art. Of course when the cross slide carriages have been moved to the proper position of adjustment they may be clamped in such position by means of T-bolts engaging in T-slots formed on the side of the bed as shown in Figs. 1 and 2 and is well understood in the art. The work spindle 24 in the head 23 is arranged to be rotated at a plurality of different speeds, as will later be explained; such work spindle being provided with a gear 28 operatively connected by means of a gear train 30, to a gear 29, arranged in a gear housing 30a secured to the head, the gear 29 being splined on a shaft 31 (see Figs. 1, 3 and 16) carried by the bed, thus allowing the adjustment of the head on the bed and maintaining the driving relation between the gear 29 and the shaft 31. A gear 32 is fixed on the shaft 31 within a change speed gear housing 33 and meshes with a gear 34 fixed on a countershaft 35 in the housing 33, which shaft in turn has also fixed thereto a gear 36 meshing with the largest gear of a gear cone 37, which, in this instance, is a five step gear cone. The gear cone 37 is fixed on a shaft 38 and each gear thereof meshes with a companion gear of a five step gear unit 39; each gear of said unit being freely rotatable on a hollow shaft 40 but capable of being separately keyed to said shaft by means of a sliding key 41 as is well known in the art.

It will be seen that the shaft 40 may be operated at any one of five different speeds by means of the gear cone 37 and the gear unit 39, such speed changes being effected by shifting the key 41 so as to key the desired gear of the unit 39 to the shaft 40, the mechanism which thus shifts the key 41 will later be described. The shaft 40 extends rearwardly from the gear housing 33 along the front side of the bed 20 and into a control device carried by the bed and containing a differential mechanism operatively connected to the shaft 40, the slide 22, and to a valve controlling the hydraulic motor that actuates the slide and which will be referred to hereinafter.

The control device is indicated at 42 (see Fig. 1) and corresponds to the control device and differential mechanism described in my copending application Serial No. 498,391 filed November 26, 1930, which control device and differential mechanism control a valve 43 for the hydraulic motor to regulate the same and provide a constant movement thereof during the feeding or relatively slow movement of the slide regardless of the variable leakage factor in the hydraulic system or other factors which might tend to cause an irregular movement of the slide. The details of the control device 42 with the differential mechanism included therein and of the control valve 43 will not be described herein for the sake of brevity, reference being had to the above mentioned copend- 42 there is a cam roll 44 corresponding to a similar cam roll in the construction disclosed in my above mentioned copending application, such cam roll being polygonal in cross section and having the same number of faces as there are faces on the turret 25. On each face of the cam roll there are mounted cams cooperating with the control device 42 in the manner specified in my said copending application, certain of these cams being omitted in Fig. 1. The cam roll 44 is supported on the front side of the machine forwardly of the bed 20 and moves backwardly and forwardly with the slide 22 being supported in bearings formed in downwardly projecting portions of the slide, the cam roll having a splined opening. The cam roll 44 is indexed and controlled in predetermined relationship with the indexing of the turret 25 and the movement of the slide 22, as will later be explained, by a control shaft 45 centrally mounted in the bed 20 and provided at the end of the machine opposite to the head with an extension supported in a suitable bracket and having a sprocket 46 keyed thereto and connected by means of a chain 48 (see Figs. 1, 4, and 5) to a similar sprocket 47 on a shaft extending through the splined opening in the cam roll 44, the cam roll shaft being supported on the bed in suitable brackets while an idler sprocket 49 also supported in the brackets is arranged intermediate the sprockets 46 and 47 as is well understood in the art.

The turret slide 22 is hydraulically actuated forwardly and rearwardly on the ways 21 of the bed by means of a hydraulic motor comprising a cylinder 50 movable with the slide and a piston and piston rod 51 arranged in the cylinder 50 and fixed with respect to the bed of the machine. The hydraulic motor is connected to a suitable source of supply of pressure fluid including a pump (later to be referred to) and a relief valve 52 (see Fig. 1) as is well known in the art; the valve 43 controlling the direction and rate of pressure fluid to the hydraulic motor in the manner and for the purpose fully explained in my said copending application. The cylinder 50 of the hydraulic motor is provided adjacent its rear end with a head 53 slidably guided and supported in the bed 20 of the machine and secured at its upper side to the slide 22 by means of a removable connecting bolt 54 and having at its lower side an operative connection with an indexing cam 55 carried by the control shaft 45 and later to be referred to more in detail, the forward end of the cylinder 50 having a reduced extension 50a supported in and guided by an opening formed in a portion of the bed 20.

The pressure fluid entering the cylinder 50 causes the cylinder and the slide to move rapidly forward toward the head of the machine for a certain distance after which the control device 42 actuates the valve 43 to automatically reduce the amount of the incoming fluid and the slide then moves more slowly toward the head, such movement being the feeding movement of the slide. When the slide has reached the predetermined position at which the feeding movement is to cease the extension 50a of the cylinder 50 engages with one of the adjustable abutment screws 56 of a suitable stop roll 57 and the forward feeding movement of the slide is arrested, a period of dwell being provided by the control mechanism in this position before the slide commences its return movement rearwardly. The stop roll 57 is rotatably mounted in the bed 20 at the head end of the machine, see Fig. 5, a shoulder 58 being arranged on one side of the bearing for the stop roll and a gear 59 integral with the stop roll being arranged at the opposite side of the bearing, the shoulder 58 and gear 59 retaining the stop roll in position and the gear 59 further serving to take the thrust when the extension 50a of the cylinder 50 engages with one of the adjustable abutment screws 56 carried by the stop roll. It will thus be seen that the arresting of the feeding movement of the slide is brought about without imposing any direct thrust upon the slide other than the usual thrust of the tool on the work and that the thrust occasioned by the engagement of the extension 50a with one of the abutment screws 56 of the stop roll is directly in line with the axial center of the cylinder that moves the slide and hence the thrust thus developed is imparted to the bed of the machine.

The gear 59 on the stop roll 57 meshes with a gear 60 fixed on the control shaft 45 whereby the stop roll 57 will be indexed in timed relation with the return movement of the slide and with the indexing of the turret. The mechanism for indexing the turret in timed relationship with the return movement of the slide has not been shown nor will it be described in detail herein, since it forms the subject matter of my copending application Serial No. 529,613, filed April 13, 1931 to which reference may be had for a clear disclosure of such mechanism.

As previously mentioned the countershaft 45 has fixed thereon a cam 55 for indexing the stop roll 57 and for operating the cams which control valves later to be referred to, this cam 55 being provided with a plurality of spiral cam grooves 61, in this instance there being five of these grooves. The head 53 of the cylinder 50 has pivoted thereto at its lower side a swinging indexing arm 62 having an upwardly turned portion 62a on one side of the pivot adapted to normally abut the head 53 under the action of a spring 63 arranged between the indexing arm 62 and the head 53. The under side of the indexing arm 62 is provided with a roller 64 for the purpose of cooperating with the cam grooves 61 of the cam 55 during the return movement of the slide to rotate the control shaft 45 through one fifth of a revolution to index the stop roll 57, the cam roll 44, and to change the relationship between the cams and valves at the forward end of the shaft as will later be explained.

During the forward movement of the slide and the cylinder 50 the roller 64 will ride over the surface of the cam 55 and the arm 62 will be swung upwardly on its pivot depressing the spring 63 and moving the upwardly extending portion 62a out of abutting engagement with the head 53. As soon as the slide has moved forwardly sufficiently to cause the roller to pass off and beyond the surface of the cam 55 the spring 63 will restore the arm 62 to its normal position with the portion 62a thereof abutting the head 53.

It will be seen that the parts are thus arranged to again cause the rotation of the control shaft 45 to index the cam 55 and that as the slide 22 moves rearwardly at the end of the next cycle of operation the roller 64 will engage in one of the cam grooves 61 and will rotate the control shaft 45 through one fifth of a revolution. It will also be seen that the rearward movement of the slide 22, and particularly during the latter portion thereof, brings about the indexing of the stop roll 57 and the indexing of the cam roll 44, such indexing movements being in timed relation one with another, and that the rearward movement of the slide further changes the relationship between the cams and valves now about to be described.

The control shaft 45 extends forwardly beyond the end of the bed at the head of the machine and above a valve housing 65, the end of the shaft 45 being supported in a bearing bracket arm secured to the housing 65 (see Figs. 5, 11, 12 and 16). The portion of the shaft 45 lying above the valve housing 65 has fixed thereto cams 66, 67, 68, 69 and 70 which operate respectively valves 71, 72, 73, 74 and 75 (see Figs. 11 and 16).

The cams 66, 67, 68, 69 and 70 are so designed and related that the indexing rotation of the control shaft 45 will cause the cams to operate their respective valves in a predetermined sequence and for predetermined periods of time. The cams 66, 67 and 68 actuate the valves that control the motors that actuate speed changing mechanism for the spindle. The valve 71 is connected by conduits 71a and 71b to the motor or cylinder 76 which actuates the shiftable clutch member 77 on the spindle 24, such clutch member 77 being movable to either of two positions so as to clutch the gear 78 or the gear 79 to the spindle. The valve 72 operated by the cam 67 is connected by the conduits 72a and 72b to the middle and one end of the three position motor or cylinder 80, while the valve 73 is connected by conduit 73a to the other end of the motor or cylinder 80.

The motor or cylinder 80 is operatively connected by suitable links and levers to a shiftable clutch member 81 arranged on a shaft 82 journaled in the head of the machine. The shaft 82 has gears 83 and 84 freely rotatable thereon at opposite sides, respectively, of the shiftable clutch member 81 and which constantly mesh with gears 85 and 86, respectively, fixed on a countershaft 87. The shaft 82 has fixed thereto a third gear 88 which constantly meshes with a gear 89 connected to the shaft 87 by means of an automatic over running-clutch as is well understood in the art. The shaft 87 also has fixed thereto gears 90 and 91 constantly meshing respectively with the gears 79 and 78 on the spindle 24.

It will be seen that the spindle 24 is driven from the shaft 82 at six varying speeds of rotation through the gearing on the shaft 82 and the gearing on the countershaft 87. The countershaft 87 may be driven at any of three speeds by the shaft 82, this being effected by movement of the motor 80 in one direction to clutch the member 81 with the gear 83 to drive the countershaft 87 through the gear 85, and by movement of the motor 80 in the opposite direction to clutch the member 81 with the gear 84 to drive the shaft 87 through the gear 86, the third speed being imparted to the countershaft 87 when the motor 80 is moved to an intermediate position whereupon the drive will be from the gear 88 to the automatic clutch gear 89. The spindle 24 may be connected to the countershaft 87 through the gears 79 and 90 or through the gears 78 and 91 by shifting the movable clutch member 77 upon movement of the motor 76 to one or the other of its alternate positions. Therefore, the three different speeds of rotation at which the countershaft 87 may be driven can be used to drive the spindle 24 at six different speeds.

The cam 69 operates the valve 74 which valve is connected by conduits 74a and 74b with a motor or cylinder 92 having an operative connection with a shiftable clutch member 93 arranged on a shaft 94. The shaft 94 has a reduced end extending into and freely rotatable in a counterbore formed in the main drive shaft 95, such shaft 94 having a fixed clutch element 96 at its end from which it will be seen that movement of the shiftable clutch member 93 into engagement with the clutch element 96 operatively connects the main drive shaft 95 with the shaft 94 and causes the gear 97 fixed thereon to drive the shaft 82 through the gear 98 carried by the latter, the gears 97 and 98 being changed speed gears. A braking member 99 forms a bearing for the shaft 94 and is fixed or keyed to the head from which it will be seen that when the motor 92 is moved to its other position the shiftable clutch member 93 will be clutched to the brake member 99 and the rotation of the shafts 94, 82 and 87 stopped, and, therefore, the rotation of the spindle 24 will likewise be stopped. The main drive shaft 95 has fixed thereon a pulley 100, shown in full lines in Figs. 1 and 2 and in dotted lines in Fig. 3, which is driven by a belt 101 passing around a pulley 102 on the shaft of a main drive motor 103.

Referring to the valves 71, 72, 73, 74 and 75 it will be seen that each of the valves are alike and are normally held in their uppermost position by means of valve springs 104. Since each of the valves correspond in construction it will only be necessary to describe specifically one of the same herein. It will be seen that each valve has sealing portions 105 adjacent its opposite ends and an annular recess 106 intermediate the sealing portions (see Fig. 12). There are three conduits communicating with each valve chamber, namely, an inlet conduit 107 and the conduits that lead to the motor which the valve controls, such as the conduits 72a and 72b shown in Fig. 12.

The inlet conduit 107 communicates with a circular chamber which is always in communication with the annular recess 106 while the conduits to the motor controlled by the valve communicate with circular chambers which may be selectively placed in communication with the recess 106. Referring to Fig. 12 of the drawings it will be seen that when the valve shown therein is in its uppermost position, which position is assumed by the valve when the cam 67 is not functioning thereon, that the pressure fluid will pass through the inlet conduit 107 into the annular recess 106 and then pass from such recess through the conduit 72a, into the motor 80 at one end thereof and will be exhausted from the motor through the conduit 72b into the valve chamber below the lower sealing portion 105 of the valve and into an exhaust chamber 108 from whence it will pass outwardly of the valve housing through an exhaust conduit 109. When the valve shown in Fig. 12 is depressed by its cam 67 the conduit 72b will be in communication with the annular recess 106 while the conduit 72a will communicate with the valve chamber above the upper sealing portion 105 of the valve. When the valve is in this position the pressure fluid will pass from the inlet conduit 107 into the recess 106, outwardly of the valve chamber through the conduit 72b, and into the motor 80 at the center thereof, being exhausted from said motor through the conduit 72a and the exhaust chamber 108 which extends from below to the upper side of the valve chamber and thence outwardly through the exhaust conduit 109. It is not believed necessary to describe in detail each of the valves since they are exactly alike and their movements to their alternate positions act to change the direction of the pressure fluid passing therethrough and to change in turn the position of the motor which each valve controls.

It will be noted that the motors 76 and 92 are two position motors and therefore only require one valve each as their controlling element whereas the motor 80 is a three position motor and in consequence of which two valves are employed to control the same, since this motor is capable of assuming an intermediate position upon the introduction thereinto of pressure fluid by a third conduit as is well understood in the art.

The cams 66, 67 and 68 are adjustable on the control shaft 45 as to position and can also be built up to form segmental cams whereby the respective valves may be held in the desired position during a number of the indexing movements of the shaft 45 to retain the motors controlled by the valves in the same position and therefore to maintain the speed changing mechanisms actuated by said motors in the same position.

In Fig. 12 the sectional illustration of the cam 67 shows clearly how the cams may be built up to form segmental cams, it being noted that the cam 67 is so formed that the valve 72 will remain in its uppermost position and the roller at the upper end of the valve pin will roll on the body of the cam 67 during the next two successive indexing movements of the control shaft 45 and, that then the valve will be depressed during the two following indexing movements of the shaft 45, it being noted that the cam is rotated by the shaft in a counterclockwise direction as indicated by the arrow in Fig. 12.

The cam 69 will be seen to be a one position cam which will depress its value 74 once during the complete indexing movement of the control shaft 45, which depression of the valve occurs at the end of the cycle of operation of the machine in order to stop the rotation of the spindle and enable the finished work to be removed and the new work piece to be loaded in the machine, it being remembered that the valve 74 controls the motor 92 which causes the shaft 94 to be clutched to the main drive shaft 95 or to the fixed brake member 99.

The cam 70 (see Figs. 11, 14 and 15) will be seen to be a five position cam and that this cam will alternately depress the valve 75 and then allow the same to return to its upper position under the action of its valve spring 104 for each indexing movement of the control shaft 45. The valve 75 is connected to a motor 110 by means of the conduits 75a and 75b from which it will be seen that the valves 75 controls the motor 110 and that the latter being connected by the yoke 111 with the shiftable key 41 acts to shift the key from one operative position to another to key the individual gears of the gear unit 39 to the shaft 40. Since the cam 70 is a five position cam and alternately depresses the valve 75 and then allows the same to return to its upper position for each indexing movement of the control shaft 45 it will be seen that the motor 110 during each indexing movement first shifts the key 41 to its most rearward position and into engagement with the largest gear of the gear unit 39 after which upon the upward movement of the valve 75 the motor 110 moves toward its other position until it is stopped by its engagement with one of the adjustable abutment pins 112 of a stop roll 113 rotatably mounted in the bed at the head end of the machine (see Figs. 6 and 16).

It will be seen that this last referred to movement of the motor 110 will cause the shiftable key 41 to move out of engagement with the largest gear of the gear unit 39 and into engagement with one of the other gears of said unit depending upon the outwardly projecting length of the abutment pin 112 with which the motor 110 abuts. It will be noted that each abutment pin 112 of the stop roll 113 is provided with five recesses 114 (see Fig. 6) so that each pin may be adjustably positioned in the stop roll and locked in such position by a lock screw 115. There are five abutment pins carried by the stop roll 113 so as to correspond in number to the faces of the turret 25 so that the required number of different speeds of rotation may be given to the shaft 40 to provide the required feeding movements of the slide 22.

The indexing of the stop roll 113 to bring the different abutment pins 112 into axial alignment with the piston rod of the motor 110 in predetermined relation with the indexing of the turret will now be described.

The stop roll 113 is indexed by the control shaft through a Geneva motion device operating a gear train as will now be described. The cam 70 is provided in this instance with five outwardly projecting pins 116 arranged to engage in the radial slots of a Geneva motion disc 117 fixed on a bearing pin 118. A gear 119 is also fixed to the Geneva motion disc 117 and meshes with a gear 120 on a second bearing pin 121. The gear 120 in turn is in mesh with a gear 122 on a third bearing pin 123, the gear 122 being in mesh with a gear 124 on the stop roll 113. It will be seen that each indexing movement imparted to the cam 70 by the control shaft 45 will cause the Geneva motion disc 117 to move through one-fifth of a revolution and that, through the gears 119, 120, 122 and 124, the stop roll 113 will be similarly moved through one-fifth of a revolution to position one of the abutment pins 112 in alignment with the piston rod of the motor 110.

Referring to the cam 69 that controls the valve 74, which in turn controls the motor 92 that actuates the shiftable clutch member 93 to start and stop the spindle in the head, it will be seen that the cam 69 is provided with a sleeve 69a splined on the control shaft 45 to enable the cam to be shifted axially on said shaft. A plurality of coil springs 125 are arranged between the cam 69 and the cam 70 in sockets formed in the respective cams (see Figs. 11 and 13) which springs act to normally maintain the cam 69 in abutting relationship with the body carrying the cams 66, 67, and 68 and in a position above the valve 74. The cam 69, however, may be displaced axially on the shaft 45 and held in such displaced position by means now to be described.

A lever 126 is connected to the shaft 127 by a bearing pin 128, the shaft 127 having one end supported in a bracket 129 secured to the bed and its other end supported in the bed and being capable of axial and rotative movements. The inner end of the lever 126 extends into a slot 130 in the bed and is provided with a spherical portion 131 which portion together with the slot 130 forms the fulcrum point about which the lever 126 may be swung (see Fig. 8). The lever 126 is provided at its outer end with an upwardly and outwardly extending portion on which is arranged a knurled handle 132 connected to a spring-pressed pull pin, such pull pin extending into a right angled slot 133 formed in the front face of the bracket 129 and having at both of its ends and at the apex thereof countersunk portions 134 in which the pull pin can engage to lock the lever in different positions of adjustment.

The shaft 127 has fixed thereto at its end opposite to that to which the lever 126 is connected an angular lever arm 135 projecting through an opening in the bed and having its angular inner end extending under the sleeve 69a of the cam 69 (see Figs. 9, 10, 11 and 13), it being noted that the upper edge of the angular inner portion of the lever 135 is provided with a recess to enable such portion of the lever to extend part way around the sleeve 69a and to also permit the free rocking movement of the lever from the full line position of Fig. 9 to the dotted line position thereof.

The machine having functioned through a complete series of operative cycles, here five in number, and being at rest with the cam 69 depressing the valve 74 (see Figs. 9 and 11), the operator in order to start the rotation of the spindle may move the handle 132 from its position as shown in Fig. 7 to the right hand end of the slot 133 to shift the cam 69 from its position as shown in Fig. 11 to its position as shown in Fig. 13. It will be seen that when the handle 132 is moved from the left-hand end of the slot 133, as shown in Fig. 7, to the right-hand end thereof, an endwise movement will be imparted to the shaft 127 and to the lever 135, such endwise movement shifting the cam 69 and sleeve 69a to the right as viewed in Fig. 11 or toward the cam 70. This movement of the cam 69 displaces the same from its aligned position with respect to the valve 74 and such valve is then free to assume its uppermost position under the pressure of its valve spring 104, it being remembered that the valve 74, when in its uppermost position, causes the actuation of the motor 92 to move the shiftable clutch member 93 into engagement with the clutch member 96 to start the operation of the spindle. If desired, the pull pin connected to the handle 132 may be engaged in the lower countersink 134 at the right-hand end of the slot to lock the parts in the position shown in Fig. 13 or the handle 132 may be returned as soon as it has been shifted to the right-hand end of the slot to its former position, whereupon the cam 69 will be moved by the springs 125 to the left and into engagement with the side of the upper portion of the valve 74. It will be noted that when the cam 69 has assumed this position and the machine is operating, the next indexing rotation of the control shaft 45 will rotate the cam 69 until it is free or clear of the upper portion of the valve 74, whereupon the springs 125 will return the cam 69 into alignment with and above the valve 74.

When the machine is in operation and it is desired to stop the rotation of the spindle, the handle 132 is shifted to the right-hand end of the slot 133 to shift the cam 69 out of the path of the valve 74 and position the inner end of the lever arm 135 in said path, whereupon the handle 132 is moved upwardly in the slot 133 to rock the shaft 127 and the lever arm 135, the inner end of the latter engaging the upper end of the valve 74 and depressing the same, as shown in dotted lines in Fig. 9 and in full lines in Fig. 13. This movement of the handle will stop the spindle instantly since when the valve 74 is depressed the motor 92 is actuated to move the shiftable clutch member 93 into engagement with the braking member 99 to thus stop the spindle from rotating.

The rotation of the spindle having been stopped during the series of cycles upon the depression of the valve 74 by the lever arm 135 as described above, it will be seen that the parts will be in the dotted line position shown in Fig. 9 with the cam 69 positioned as in Fig. 13. The operator in order to again start the rotation of the spindle and restore the cam 69 to its operative position above the valve 74 so that the series of operative cycles may continue until completed, moves the handle 132 downwardly and then to the left in the slot 133, the downward movement of the handle raising the lever arm 135 out of engagement with the valve 74, to allow the valve to assume its upper position as shown in full lines in Fig. 9, while the movement of the handle to the left allows the springs 125 to shift the cam 69 into position above the valve 74. When the cam 69 is thus positioned and the last cycle of the series of operative cycles is completed, it will be seen that the indexing rotation of the control shaft 45 will have rotated the cam 69 until it engages the valve 74 and depresses the latter, and thus effects the engagement of the shiftable clutch member 93 with the braking member 99 to stop the rotation of the spindle.

Under certain circumstances as, for example, when an automatic stock feeding equipment is being used, it may not be necessary to stop rotation of the spindle upon the completion of each series of operative cycles, but on the contrary, the spindle can be allowed to rotate continuously. The continuous rotation of the spindle may be obtained by shifting the lever 126 and the handle 132 to the right-hand end of the slot 133, that is, from the position of the handle shown in Fig. 7 to the end of the horizontal portion of the slot, such shifting movement of the handle resulting in shifting the cam 69 axially on the control shaft 45, toward the cam 70 and into the position shown in Fig. 13. The pull pin connected to the handle 132 can be engaged in the countersink at the right-hand end of the slot 133 when the lever is so positioned to retain the handle and lever in such position and the cam 69 in the position shown in Fig. 13, the subsequent rotation of the cam 69 by the control shaft 45 while in this position being ineffective to depress the valve 74.

When the machine is operating with a continuous rotation of the spindle, occasion might arise wherein it is necessary to stop the rotation of the spindle, and this can be accomplished by raising the handle 132 from the lower end to the upper end of the vertically extending portion of the slot 133, thereby causing the lever arm 135 to depress the valve 74 and stop the rotation of the spindle.

Although separate pumps might be employed to supply the pressure fluid to the hydraulic motor that actuates the slide and to the hydraulic motors at the head end of the machine which actuate the speed changing mechanism for the spindle and the feed changing mechanism for the slide, I propose to employ a single pump for all of the motors, such pump being indicated at 136 in Figs. 2 and 3, and being driven through a belt and pulleys, indicated in their entirety at 137, by an electric motor 138, such motor also driving a secondary pump 139 for supplying coolant to the cutting tools of the machine.

In order to clearly coordinate the structural details of the machine and to more definitely set forth the present invention and the advantages inherent therein, the operation of the machine through a complete series of operative cycles will now be briefly described.

The spindle 24 being at rest and the slide 22 being in its most rearward position, the cam 69 will be in the position shown in Fig. 11, and the valve 74 will be depressed, assuming the lever 126 to be located in the position shown in Fig. 7, which is its inoperative position, and it further being assumed that the electric motors 103 and 138 are operating.

In order to initiate the rotation of the spindle 24 after a new work piece has been positioned thereon and to start the operation of the machine through a complete series of operative cycles to complete the machining of said work piece, the operator first shifts the handle 132 to the right, as viewed in the drawings, to move the cam 69 out of the path of the valve 74 and allow the latter to move to its uppermost position under the action of its valve spring 104, and then he returns the handle 132 to its former position, the cam 69 being moved by the springs 125 into engagement with the side of the upper portion of the valve 74. When the valve 74 is in its uppermost position, the motor 92 shifts the shiftable clutch member 93 into engagement with the clutch member 96 and the rotation of the spindle commences. The operator in order to start the rapid forward and feeding movements of the slide shifts the lever 42a of the control device 42 from neutral into rapid forward position, as described in my co-pending application, Serial Number 498,391, hereinbefore referred to, to thus start the slide in rapid forward motion toward the spindle 24. As the slide 22 moves forwardly the cams on the cam roll 44 shift the control device 42 so as to change the movement of the slide from rapid forward into feeding movement, during which movement the work and tool are in cutting engagement.

It will be remembered that during the forward movement of the slide 22 the pivoted indexing arm 62 is swung upwardly by the indexing cam 55 and compresses the spring 63, the roller 64 carried by the indexing arm riding over the surface of the indexing cam, and that the indexing arm 62 is restored to its normal position by the spring 63 as soon as the roller 64 has passed off of the surface of the indexing cam.

When the slide 22 has completed its feeding movement the extension 50a of the cylinder 50 engages with one of the adjustable abutment screws 56 carried by the stop roll 57 and the forward movements of the slide and cylinder are arrested, the arresting of the slide acting through the differential mechanism of the control device 42 to first allow a period of dwell and then to shift the lever 42a automatically to rapid return position, thereby shifting the control valve 43 to change the direction of flow of the fluid pressure supply to the cylinder 50.

The slide 22 moves rearwardly and near the end of its rearward movement the turret 25 is indexed by the mechanism described in my previously mentioned co-pending application, Serial Number 529,613, and at the same time the roller 64 carried by the indexing arm 62 engages in one of the spiral cam grooves 61 in the indexing cam 55 and imparts an indexing movement to the indexing cam and to the control shaft 45.

The indexing movement of the control shaft 45 indexes the cam roll 44 which is connected to the shaft 45 through the sprockets 46 and 47 and chain 48, to change the point at which the rapid forward movement of the slide stops and the feeding movement thereof commences. The indexing movement of the control shaft 45 also indexes the stop roll 57, it being remembered that the control shaft 45 is geared to the stop roll through the gears 59 and 60, this indexing of the stop roll 57 bringing a different adjustable abutment screw 56 into alignment with the extension 50a of the cylinder 50 to change the point of dwell at which the feeding movement of the slide ends and the rapid return movement thereof commences. It will further be noted that the indexing rotation of the control shaft 45 indexes, through the Geneva motion disc 117 which is actuated by the pins 116 carried by the cam 70 on the shaft 45, the stop roll 113, to position a different adjustable abutment pin 112 in the path of movement of the piston rod of the motor 110 to arrest the movement of the motor 110 at a different point to thereby cause a different gear of the gear unit 39 to be keyed to the shaft 40 which operates the control device 42 and to thus change the rate of feeding movement of the slide, said shaft 40 being driven from the spindle 24 in timed relation therewith by the gearing previously described in detail herein and shown in the diagrammatic illustration of Fig. 16. It will also be remembered that each indexing movement of the control shaft 45 causes the cam 70 to first depress the valve 75 and to then allow the same to return to its uppermost position, to the end that the piston of the motor 110 will first be moved to its extreme right-hand position, as viewed in Fig. 16 to clear all of the abutment pins 112, after which it will be moved toward the left until the piston rod engages with the abutment pin 112 that is in alignment therewith.

Before describing the effect of the indexing movements of the control shaft 45 upon the cams 66, 67 and 68, it will be well to refer to the manner in which these cams are formed. Since the purpose of these cams is to bring about different speeds of rotation of the spindle 24 during the different cycles of operation of the machine, it will be seen that these cams will be built up in a manner such that the speed changing mechanism for the spindle will be operated in the proper sequence in a predetermined way to effect the desired speeds of rotation of the spindle 24. It will also be seen that the indexing rotation of the control shaft 45 will change the positions of the motors 76 and 80 when it is desired to change the speeds of rotation of the spindle 24 through the mechanism which these motors actuate, these changes being controlled by the valves 71, 72 and 73 when they are operated by the cams 66, 67 and 68 respectively.

The rapid forward and feeding movements of the slide occur in a similar manner to that described above during each of the remaining cycles of operation and the cam roll 44 and stop rolls 57 and 113 are indexed at the end of the return movement of the slide during each cycle of operation, it being remembered that the turret 25 is also indexed in timed relation with the stop rolls.

At the end of the fifth cycle of operation the cam 69 will have been moved through a complete revolution and will engage the valve 74 and depress the same to stop the rotation of the spindle 24, while a cam on the cam roll 44 will trip the differential mechanism in the control device 42 to bring the lever 42a into neutral position and to stop the movement of the slide 22.

It will be understood that the cross slides 27 and 27a are operated by the movement of the slide 22 and that these cross slides can move inwardly during any one of the operative cycles of the machine to bring the tools carried thereby into cutting relationship with the work.

From the foregoing description it will be noted that the series of valves controlling the hydraulic operating mechanism of the machine are actuated in the proper sequence by means, which in this instance is the control shaft 45, operated by a movable member of the machine, such movable member being the turret slide. It will further be noted that the centrally arranged control shaft is operatively connected with the mechanism for indexing an indexible member of the machine such as the cam roll or the stop rolls and that the indexing of such member is controlled by the movement of the main or turret slide. In addition it should be noted that the control means is located at the head end of the machine and is operable for shifting the valves controlling the different operating speeds of the spindle. Likewise it will be seen that a single valve and a stop roll control the plurality of feeding speeds for the slide. The turret slide, the stop roll for limiting the movements of the turret slide and the indexing mechanism for the turret are operated in timed relationship one with the other. The machine also includes manually operated means connected to the stop and start valve located in the head end of the machine and controlling the stopping and starting of the spindle, thus providing manual as well as automatic control. Also it will be seen that the stop roll for the turret slide is arranged at the head end of the machine and is operated by the central control shaft 45 carried by the bed and in turn having an operable connection with the slide so as to be controlled by the movements of the slide and an operative connection with the indexing mechanism so that the latter is operated in timed relationship with the stop roll.

Although a specific embodiment of the invention has been illustrated and described herein it should be understood that the invention is not to be limited thereto, but is to be read in the light of the appended claims and that such modifications and adaptations as fall within the scope of said claims are intended to be covered thereby.

Having thus described my invention I claim:

1. A machine tool comprising two members one of which is relatively movable in opposite directions with respect to the other, one of said members being provided with a spindle and the other with an indexible member, means for rotating said spindle at different speeds, and hydraulic means for controlling the spindle speeds actuated by the movable member during its movement in one operative cycle for changing the spindle speed during the movement of the movable member in the following cycle.

2. A machine tool comprising two members one of which is relatively movable in opposite directions with respect to the other, one of said members being provided with a spindle and the other with an indexible member, means for rotating said spindle at different speeds, and hydraulic means for controlling the spindle speeds including valves actuated by the movable member during its movement in one operative cycle for changing the spindle speed during the movement of the movable member in the following cycle.

3. A machine tool comprising two members one of which is relatively movable with respect to the other, one of said members being provided with a spindle and the other with an indexible member, means for rotating said spindle at different speeds, and hydraulic means for controlling the spindle speeds including valves and operating cams therefor, said cams being actuated by the movable member during its movement in one operative cycle thereof for changing the spindle speed during the movement of the movable member in the next operative cycle.

4. A machine tool comprising two members one of which is relatively movable toward and from the other, one of said members being provided with a spindle, means for rotating said spindle at different speeds, hydraulic means for controlling the spindle speeds including control valves, an indexible control shaft provided with cams for actuating said valves, and means operatively connecting said control shaft with the movable member to index said shaft during movement of said member.

5. A machine tool comprising a head provided with a spindle, a slide movable toward and from said head and provided with an indexible member, means for rotating said spindle at different speeds, hydraulic means for controlling the spindle speeds and including valves actuated by the slide during its movement in one direction in an operative cycle for changing the spindle speed during the movement of the slide in the following cycle.

6. A machine tool comprising a head having a spindle therein, a slide movable toward and from said head, means for rotating said spindle at different speeds, hydraulic means controlling said first named means, control valves for said hydraulic means, a rotatable control shaft provided with cams for actuating said valves, and cooperating means on said control shaft and said slide for operating said shaft during movement of said slide in one direction.

7. A machine tool comprising two members one of which is relatively movable with respect to the other, one of said members being provided with a spindle, means for rotating said spindle at different speeds, means for varying the rate of movement of the movable member, hydraulic means for controlling the spindle speeds and the rate of movement of the movable member and including valves actuated by the movable member during one operative cycle for presetting the spindle speed and the rate of movement of the movable member for the following cycle.

8. A machine tool comprising two members one of which is relatively movable with respect to the other, one of said members being provided with a spindle, means for rotating said spindle at different speeds, means for varying the rate of movement of the movable member, hydraulic means for controlling the spindle speeds and the rate of movement of the movable member and including valves and operating cams therefor, said cams being actuated by said movable member during one operative cycle thereof for presetting the spindle speed and the rate of movement of the movable member for the following cycle.

9. A machine tool comprising two members one of which is relatively movable with respect to the other, one of said members being provided with a spindle, means for rotating said spindle at different speeds, means for varying the rate of movement of the movable member, hydraulic means controlling both of said means, control valves for said hydraulic means, a control shaft provided with cams for actuating said valves, and cooperating means on said control shaft and said movable member for operating said shaft during movement of said member in one direction.

10. A machine tool comprising two members one of which is relatively movable with respect to the other, one of said members being provided with a spindle, mechanism for rotating said spindle at different speeds, means for stopping said mechanism, a shaft directly movable by said movable member and hydraulic means operated and controlled by said shaft for controlling said first named means.

11. A machine tool comprising two members one of which is relatively movable with respect to the other, one of said members being provided with a spindle, mechanism for rotating said spindle at different speeds, means for stopping said mechanism, hydraulic means for controlling said first named means, control valves for said hydraulic means, and a shaft directly movable by the movable member for actuating said control valves.

12. A machine tool comprising two members one of which is relatively movable with respect to the other, one of said members being provided with a spindle, mechanism for operating said spindle at different speeds and for moving said member at different rates of movement, means for stopping said mechanism, hydraulic means controlling said first named means, a shaft directly movable by said movable member, and control valves for said hydraulic means actuated by said shaft.

13. A machine tool comprising two members one of which is relatively movable with respect to the other and is provided with an indexible member, means for varying the rate of movement of the movable member, a hydraulic motor controlling said first named means, and means controlling said hydraulic motor and actuated by the movable member during one operative cycle to preset the rate of movement for the following cycle.

14. A machine tool comprising two members one of which is relatively movable with respect to the other and is provided with an indexible member, means for varying the rate of movement of the movable member, a hydraulic motor controlling said first named means, means controlling said hydraulic motor, and a control shaft operated by the movement of said movable member and actuating said last named means during one operative cycle to preset the rate of movement for the following cycle.

15. A machine tool comprising two members one of which is relatively movable with respect to the other and is provided with an indexible member, means for varying the rate of movement of the movable member, a hydraulic motor controlling said means, means controlling said hydraulic motor and including a stop roll to control the extent of movement of the movable part of the motor to obtain the desired rate of movement for the movable member, and means operated by the movement of said movable member and actuating the said second named means.

16. A machine tool comprising two members one of which is relatively movable with respect to the other and is provided with an indexible member, means for varying the rate of movement of the movable member, a hydraulic motor controlling said means, means controlling said hydraulic motor and including a control valve therefor and a stop roll to control the extent of movement of the movable part of the motor to obtain the desired rate of movement for the movable member, and means operated by the movement of said movable member and actuating the said second named means.

17. A machine tool comprising two members one of which is relatively movable with respect to the other and is provided with an indexible member, means for varying the rate of movement of the movable member, a hydraulic motor controlling said means, means controlling said motor and including a stop roll to control the extent of movement of the movable part of the motor to obtain the desired rate of movement for the movable member, a control valve for said motor and a cam actuating said valve and operatively connected with said stop roll, and means operated by the movement of said movable member and actuating said cam.

18. A machine tool comprising two members one of which is relatively movable with respect to the other and is provided with an indexible member, means for varying the rate of movement of the movable member, a hydraulic motor controlling said means, means controlling said hydraulic motor and including a control valve therefor, a stop roll to control the extent of movement of the movable part of the motor to obtain the desired rate of movement for the movable member, a cam for actuating said valve, and a Geneva motion mechanism operatively connecting said cam and said stop roll, and means operated by the movement of said movable member for actuating said cam.

19. A machine tool comprising two members one of which is relatively movable with respect to the other and is provided with an indexible member, means for varying the rate of movement of the movable member, a hydraulic rotor controlling said means, means controlling said hydraulic motor and including a control valve, a stop roll to control the extent of movement of the movable part of the motor to obtain the desired rate of movement for the movable member, a control shaft provided with a cam for actuating said valve, a Geneva motion mechanism operatively connecting said cam with said stop roll, and cooperating means on said control shaft and said movable member for actuating said shaft, cam, valve and stop roll during movement of said movable member in one direction.

20. A machine tool comprising two members one of which is relatively movable with respect to the other and is provided with an indexible member, a stop roll for arresting the movement of said movable member, a control shaft actuated by the movement of said movable member and means operatively connecting said control shaft and said stop roll to index the latter during the movement of said movable member.

21. A machine tool comprising two members one of which is relatively movable with respect to the other and is provided with an indexible member, a stop roll for arresting movement of said movable member in one direction, a control shaft actuated by said movable member during its movement in the opposite direction, and means operatively connecting said control shaft and said stop roll to index the latter during the movement of said movable member in the said opposite direction.

22. A machine tool comprising two members one of which is relatively movable with respect to the other and is provided with an indexible member, means for varying the rate of movement of the movable member, a hydraulic motor controlling said means, means controlling said hydraulic motor, a stop roll for arresting the movement of said movable member, and means operated by the movement of said movable member for actuating said second named means and said stop roll.

23. A machine tool comprising two members one of which is relatively movable with respect to the other, one of said members being provided with a spindle and the other with an indexible member, means for rotating said spindle at different speeds, means for varying the rate of movement of the movable member, hydraulic means controlling both of said means, a stop roll for arresting the movement of said movable member, and means operated by the movable member for controlling both of said first named means and said stop roll.

24. A machine tool comprising two members one of which is relatively movable with respect to the other, one of said members being provided with a spindle and the other with an indexible member, means for rotating said spindle at different speeds, means for varying the rate of movement of the movable member, hydraulic means controlling both of said means, a stop roll for arresting the movement of said movable member, and a control shaft operated by the movement of said movable member and operatively connected with said hydraulic means and said stop roll for controlling all of the same.

25. A machine tool comprising two members one of which is relatively movable with respect to the other, one of said members being provided with a spindle and the other with an indexible member, means for rotating said spindle at different speeds, means for varying the rate of movement of the movable member, hydraulic means controlling both of said means, control valves for said hydraulic means, a stop roll for arresting the movement of said movable member, and a control shaft operated by the movement of said movable member and having an operative connection with said stop roll and provided with cams for actuating said valves.

26. A machine tool comprising two members, one of which is relatively movable with respect to the other, one of said members being provided with a spindle and the other with an indexible member, means for rotating said spindle at different speeds, means for varying the rate of movement of the movable member, hydraulic means controlling said first named means, control valves for said hydraulic means, a hydraulic motor controlling said second named means, means controlling said hydraulic motor and including a stop roll to control the extent of movement of the movable part of the motor to obtain the desired rate of movement for the movable member, a control shaft operated by the movement of said movable member and actuating said valve and said stop roll, and a second stop roll for arresting the movement of said movable member and operatively connected with said control shaft.

27. A machine tool comprising two members one of which is relatively movable with respect to the other, one of said members being provided with a spindle, means for rotating said spindle at different speeds and for starting and stopping the rotation thereof, hydraulic means automatically operated and controlled by the movable member for controlling said first named means, and manually operated means for controlling said hydraulic means to start and stop the rotation of said spindle.

28. A machine tool comprising two members one of which is relatively movable with respect to the other, one of said members being provided with a spindle, means for starting and stopping the rotation of said spindle, hydraulic means for operating said first named means, means actuated by the movement of said member for automatically controlling said hydraulic means and manually operated means for rendering said last named means ineffective and for controlling said hydraulic means.

29. A machine tool comprising two members one of which is relatively movable with respect to the other, one of the members being provided with a spindle, means for starting and stopping the rotation of said spindle, hydraulic means controlling said last named means, a cam controlling said hydraulic means and operated by the movement of said member, and a manually operative means for rendering said cam ineffective and for controlling said hydraulic means 30. A machine tool comprising in combination, a bed, a slide movable thereon and provided with an indexible member, a hydraulic motor for actuating said slide, a control valve for said motor, a control device for said valve, a cam roll having cams cooperating with said device, a shaft operable by the movement of said slide, and means operable by the movement of said slide for indexing said cam roll.

31. A machine tool comprising in combination, a bed, a slide movable thereon and provided with an indexible member, a hydraulic motor for actuating said slide, a control valve for said motor, a control device for said valve, a cam roll having cams cooperating with said device, and a control shaft operatively connected with said cam roll to index the latter, said control shaft being actuated by the movement of the slide.

32. A machine tool comprising in combination, a bed, a slide movable thereon and provided with an indexible member, a hydraulic motor for actuating said slide, a control valve for said motor, a control device for said valve, a cam roll having cams cooperating with said device, a stop roll for limiting the movement of said slide, and a control shaft cooperatively connected with said cam roll and said stop roll and actuated by the movement of said slide.

33. A machine tool comprising two members one of which is relatively movable with respect to the other, one of said members being provided with a spindle and the other with an indexible member, means for rotating said spindle at different speeds, means for varying the rate of movement of the movable member, hydraulic means controlling both of said means, an indexible shaft controlling said hydraulic means, and means carried by said movable member and cooperating with said shaft to index the same.

34. A machine tool comprising two members one of which is relatively movable with respect to the other, one of said members being provided with a spindle and the other with an indexible member, means for rotating said spindle at different speeds, means for varying the rate of movement of the movable member, hydraulic means controlling both of said means, and a single means carried by said movable member and operatively connected with said hydraulic means to control the same.

35. A machine tool comprising two members one of which is relatively movable with respect to the other and is provided with an indexible turret, means for varying the rate of movement of said movable member, hydraulic means controlling said means, an operative connection between said hydraulic means and said movable member including an indexible member, and a single means carried by the movable member to actuate said indexible member to control the rate of movement of the movable member.

36. A machine tool comprising a bed having ways, a member movable along the ways and provided with an indexible turret, means for varying the rate of movement of said member, hydraulic means controlling said means, and means located intermediate the ways and including an indexible member for controlling said last named means and actuated by the movement of said movable member.

37. A machine tool comprising a bed, a member movable along said bed and provided with an indexible turret, a second member on said bed and provided with a spindle, means for rotating said spindle at different speeds, means for varying the rate of movement of the movable member, hydraulic means controlling both of said means, an operative connection between said hydraulic means and said movable member including an indexible member, and a single means carried by the movable member to actuate said indexible member to control the rate of movement of the movable member and the speed of the spindle.

38. A machine tool comprising two members one of which is relatively movable with respect to the other and is provided with an indexible turret, means for varying the rate of movement of the movable member, hydraulic means controlling said means, and means including an indexible member actuated by the movable member for controlling said hydraulic means to obtain a different rate for successive movements of said movable member.

39. A machine tool comprising two members one of which is relatively movable with respect to the other, one of said members being provided with a spindle and the other with an indexible turret, means for rotating said spindle at different speeds, means for varying the rate of movement of the movable member, hydraulic means controlling both of said means, and operative connection between said hydraulic means and said movable member including an indexible member, and a means carried by the movable member to actuate said indexible member to obtain a different rate of speed for the spindle and a different rate of movement for said movable member for successive movements of said movable member.

40. A machine tool comprising two members one of which is relatively movable with respect to the other and is provided with an indexible member, means for varying the rate of movement of the movable member, hydraulic means controlling said means and including valves controlling the same, and indexible means actuated by the movable member to actuate said valves and control said hydraulic means to obtain a different rate of movement of said movable member for successive movements thereof.

41. A machine tool comprising two members one of which is relatively movable with respect to the other and is provided with an indexible member, means for varying the rate of movement of the movable member, hydraulic means controlling said means and including valves controlling the same, indexible means operatively connected with said valves, and means carried by said movable member for operating said indexing means to obtain a different rate of movement for successive movements of said movable member.

42. A machine tool comprising two members one of which is relatively movable with respect to the other, one of said members being provided with a spindle and the other with an indexible member, means for rotating said spindle at different speeds, means for varying the rate of said movable member, hydraulic means controlling both of said means and including control valves, and indexible means actuated by the movement of said movable member for actuating said valves and controlling said hydraulic means to obtain a different speed for said spindle and different rate of movement for said movable member for successive movements of said movable member.

43. A machine tool comprising two members one of which is relatively movable with respect to the other, one of said members being provided with a spindle and the other with an indexible turret, means for rotating said spindle at different speeds, means for varying the rate of movement of the movable member, hydraulic means controlling both of said means and including control valves, an indexible member actuating said valves and controlling said hydraulic means, and means carried by the movable member for actuating said indexible member to obtain a different speed for said spindle and a different rate of movement for said movable member for successive movements of said movable member.

44. A machine tool comprising two members one of which is relatively movable with respect to the other and is provided with an indexible member, means for varying the rate of movement of the movable member, hydraulic means controlling said means and including control valves, and means indexed by the movement of said movable member in one direction for actuating said valves and controlling said hydraulic means to obtain a different rate of movement of said movable member for successive movements thereof.

45. A machine tool comprising two members one of which is relatively movable with respect to the other, one of said members being provided with a spindle and the other with an indexible member, means for rotating said spindle at different speeds, hydraulic means controlling said means and including control valves, and means indexed by the movement of said movable member in one direction to actuate said valves and control said hydraulic means to obtain a different speed for said spindle for successive movements of said movable member.

46. A machine tool comprising two members one of which is relatively movable with respect to the other and provided with an indexible member, a hydraulic motor for moving said member operatively connected thereto, means for actuating said hydraulic motor, and a stop roll for limiting the movement of said member and arranged in substantially longitudinal alignment with said motor and engaged by a part thereof.

47. A machine tool comprising two members one of which is relatively movable with respect to the other and provided with an indexible member, a hydraulic motor for moving said member and having a portion carried by said member and another portion fixed with respect thereto, means for actuating said motor, a stop roll for limiting the movement of the movable portion of said motor and arranged substantially in longitudinal alignment therewith, and a support for said stop roll maintaining the same against longitudinal displacement.

48. A machine tool comprising two members one of which is relatively movable with respect to the other and provided with an indexible member, a hydraulic motor operatively connected with said movable member for moving the same, means for varying the rate of movement of said member, means controlling said last named means, and means carried by said motor for indexing said last named means to obtain a different rate of movement of said member for successive movements thereof.

49. A machine tool comprising a bed having a plurality of guideways, a slide movable along one of said guideways, a hydraulic motor having a cylinder movable in another of said guideways and operatively connected with said slide and a piston fixed with respect to said bed, and means for actuating said motor to move said slide.

EDWARD P. BURRELL.